United States Patent [19]

Nishimura

[11] Patent Number: 4,852,908
[45] Date of Patent: Aug. 1, 1989

[54] WEBBING DRIVING DEVICE FOR USE IN SEAT BELT APPARATUS

[75] Inventor: Yuji Nishimura, Niwa, Japan

[73] Assignee: Kabushiki Kaisha Tokai-Rika-Denki-Seisakusho, Aichi, Japan

[21] Appl. No.: 242,209

[22] Filed: Sep. 9, 1988

[30] Foreign Application Priority Data

Sep. 18, 1987 [JP] Japan ............................ 62-142685[U]
Sep. 18, 1987 [JP] Japan ............................ 62-142684[U]
Sep. 18, 1987 [JP] Japan ............................ 62-142686[U]
Sep. 18, 1987 [JP] Japan ............................ 62-142687[U]

[51] Int. Cl.$^4$ ............................................. B60R 21/10
[52] U.S. Cl. ..................................... 280/804; 280/802
[58] Field of Search ................................. 280/802, 804

[56] References Cited

U.S. PATENT DOCUMENTS 4,410,202 10/1983 Takada ................................. 280/804
4,498,690 2/1985 Takada ................................. 280/804
4,564,218 1/1986 Yokote et al. ......................... 280/804
4,655,477 4/1987 Takada ................................. 280/804

Primary Examiner—Kenneth R. Rice
Attorney, Agent, or Firm—Oliff & Berridge

[57] ABSTRACT

A webbing driving device which is capable of maintaining a constant gap or space between a wire and a sheet around the periphery of a drum. The webbing driving device includes a rotatable drum, a screw plate to which the wire is connected and is movable in the axial direction of the drum when rotated together with the drum, a wire driver for winding the wire around the drum in helical fashion, a first sloping surface formed on the screw plate parallel to the direction in which the wire is wound around the drum so as to define one end of the wire winding area and a second sloping surface formed parallel to the direction the wire is wound around the drum so as to define the other end of the wire winding area. The gap is formed by the first and second sloping surfaces. The gap between the wire and the two sloped surfaces is constant around the periphery of the drum, and the gap between the wire and the sheet can be set to a constant value around the periphery of the drum.

20 Claims, 3 Drawing Sheets

FIG. I

WEBBING DRIVING DEVICE FOR USE IN SEAT BELT APPARATUS

BACKGROUND OF THE INVENTION

1. Field of the Invention

The present invention relates to a webbing driving device for use in a seat belt apparatus which drives webbing for restraining an occupant through a wire so as to automatically fastening the webbing on the occupant, or to release the webbing from the occupant.

2. Description of the Related Art

There are conventional automatic seat belt apparatuses for automatically fastening a webbing on an occupant by driving the webbing in the lengthwise direction of the vehicle using a webbing driving device after the occupant gets in a vehicle are known.

Webbing driving devices of a type which drives the webbing in the lengthwise direction through a wire have been proposed. Such webbing driving devices include a drum and a screw plate to which the wire is connected, and the screw plate is supported by a screw means in such a manner as to be movable in an axial direction of the drum. The webbing driving device of this type is adapted to drive the webbing in the lengthwise direction of the vehicle by rotating the drum and the screw plate and thereby winding the wire around the drum in helical fashion, and by rotating the drum and the screw plate and thereby drawing the wire from the drum while limiting the movement of the wire wound around the drum in the axial direction of the drum by a sheet and the screw plate.

In the webbing driving device of the above-described type, although the wire is wound around the drum in helical fashion, a sheet is flat. This makes the wire wound around the drum by an angle with respect to the sheet and thereby causes a gap or a space between the wire and the sheet fluctuate in the circumferential direction of the drum. Further, the screw plate is also flat relative to the wire which is wound around the drum in helical fashion, and the gap between the wire and the sheet cannot therefore be kept constant. If the gap between the wire and the sheet is too large, noises are generated due to unnecessary movement of the wire which occurs when the wire is drawn from the drum. With a too small gap, the sheet pinches the wire between the wire and the sheet. It is therefore preferable to provide the gap with a fixed value around the periphery of the drum.

SUMMARY OF THE INVENTION

In view of the above-described problems of the prior art, an object of the present invention is to provide a webbing driving device for a seat belt apparatus which is capable of maintaining a gap or a space between a wire and a To this end, the present invention provides a webbing driving device for use in a seat belt apparatus to fasten on a driver or a passenger a webbing for fastening the driver or the passenger or releases placement of a webbings on an occupant and to release the webbing by moving a wire to which the webbing is connected. The webbing driving device comprises: a rotatable drum; a screw plate to which the wire is connected, the screw plate which is movable in the axial direction of the drum when rotated together with the drum; a wire driving means for winding the wire around the drum in helical fashion by rotating the drum and the screw plate in a first direction while moving the screw plate in one direction of the axial direction, and for drawing the wire from the drum by rotating the drum and the screw plate in a second directing opposite from the first direction while moving the screw plate in the other direction of the axial direction; a first sloping surface formed on the screw plate substantially parallel to the direction in which the wire is wound around the drum so as to define one end of the wire winding area in the axial direction of the drum; and a second sloping surface formed substantially parallel to the direction in which the wire is wound around the drum so as to define the other end of the wire winding area in the axial direction of the drum.

In the present invention, the gap for accommodating the wire is defined in the axial direction of the drum by the first and second sloping surfaces formed substantially parallel to the direction in which the wire is wound around the drum. In consequence, the gap between the wire and the second sloping surface, as well as the gap between the wire and the first sloping surface, is made constant around the periphery of the drum, and the gap between the wire and a sheet can thereby be set to a substantially constant, suitable value around the periphery of the drum.

DETAILED DESCRIPTION OF THE PREFERRED EMBODIMENTS

Figure 3:
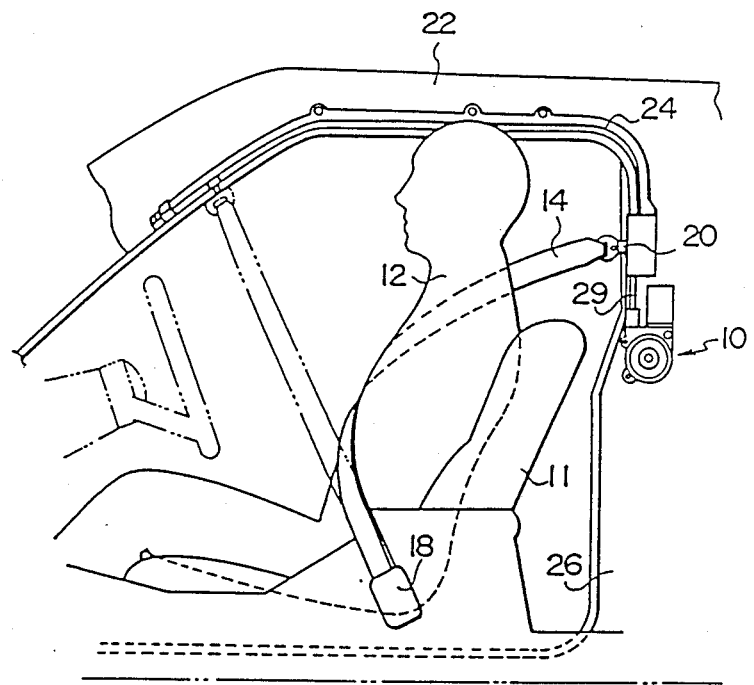
FIG. 3 is a side view of a seat belt apparatus which employs the webbing driving device of FIG. 1, as seen when looking from a side of a vehicle.

FIG. 3 shows a seat belt apparatus which employs a webbing driving device 10 according to the present invention.

In this seat belt apparatus, a webbing 14 is placed on an occupant 12 sitting in a seat 11. The webbing 14 is drawn from a winding device 18 mounted on substantially the central portion of a vehicle. The winding device 18 incorporates an inertia locking mechanism for stopping the drawing out of the webbing 14 from the winding device when the speed of the running vehicle is reduced.

Figure 1:
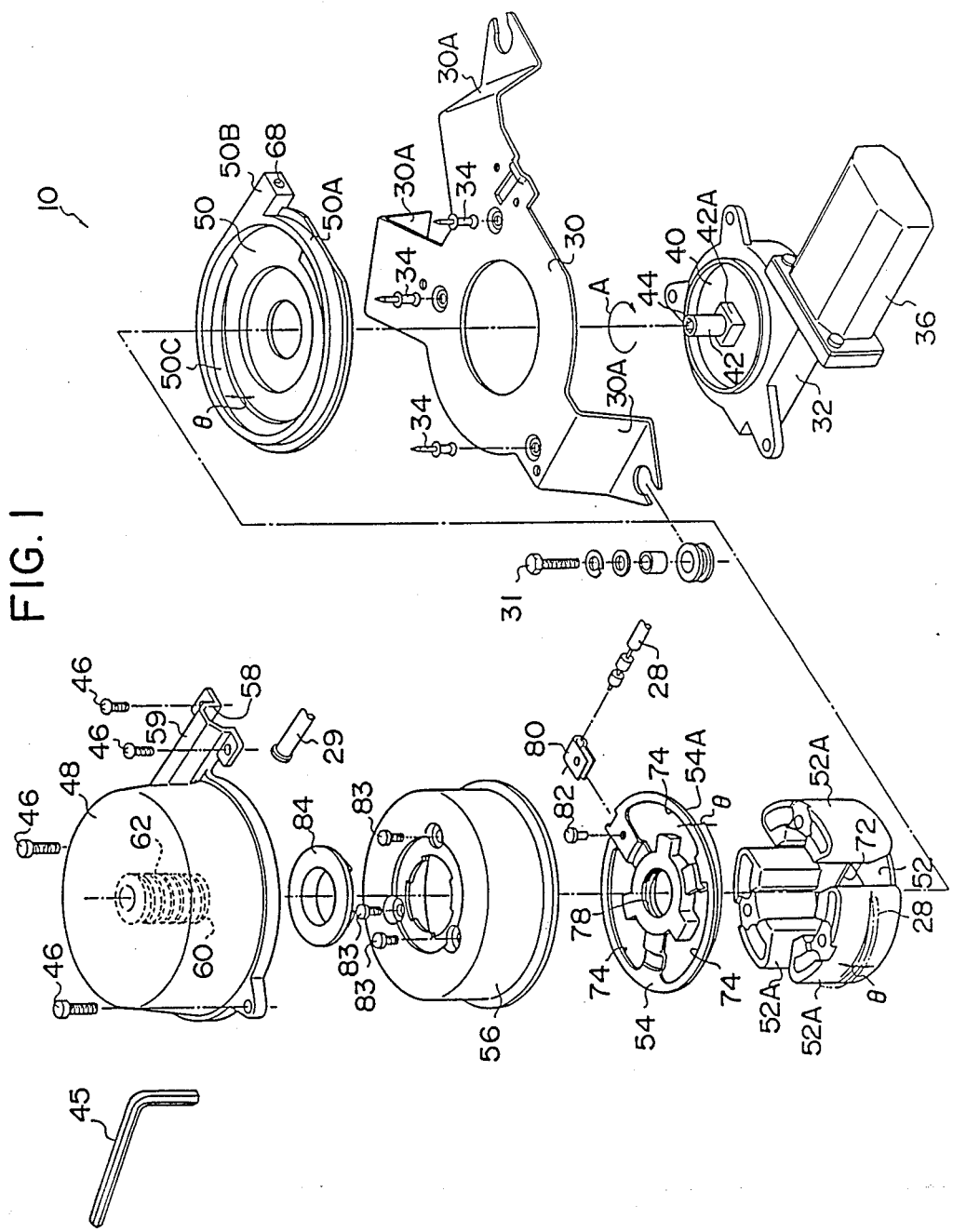
FIG. 1 is a perspective view of a webbing driving device of the present invention.

The forward end of the webbing 14 drawn out of the winding device 18 is provided with a slider 20 which is moved while being guided along a guide rail 24 running in the lengthwise direction of the vehicle along a roof side rail 22. One end portion of a wire 28 shown in FIG. 1 is coupled to the slider 20, and the slider 20 is moved through the wire 28 in the lengthwise direction of the vehicle along the guide rail 24 by a webbing driving device 10 mounted on the intermediate portion of a center pillar 26. In the state where the slider 20 is located at the rear end portion of the guide rail 24, the webbing 14 is put on the occupant 12, as shown by a solid line in FIG. 3. On the other hand, in the state where the slider 20 is at the forward end portion of the guide rail 24, as shown by an imaginary line, the webbing 14 is separated from the occupant 12. The portion of the wire 28 which lies between the slider 20 and the webbing driving device 10 is tightly accommodated in a tube 29 disposed between the end of the guide rail 24 and the webbing driving device 10 in such a manner it can be moved in the longitudinal direction.

Figure 2:
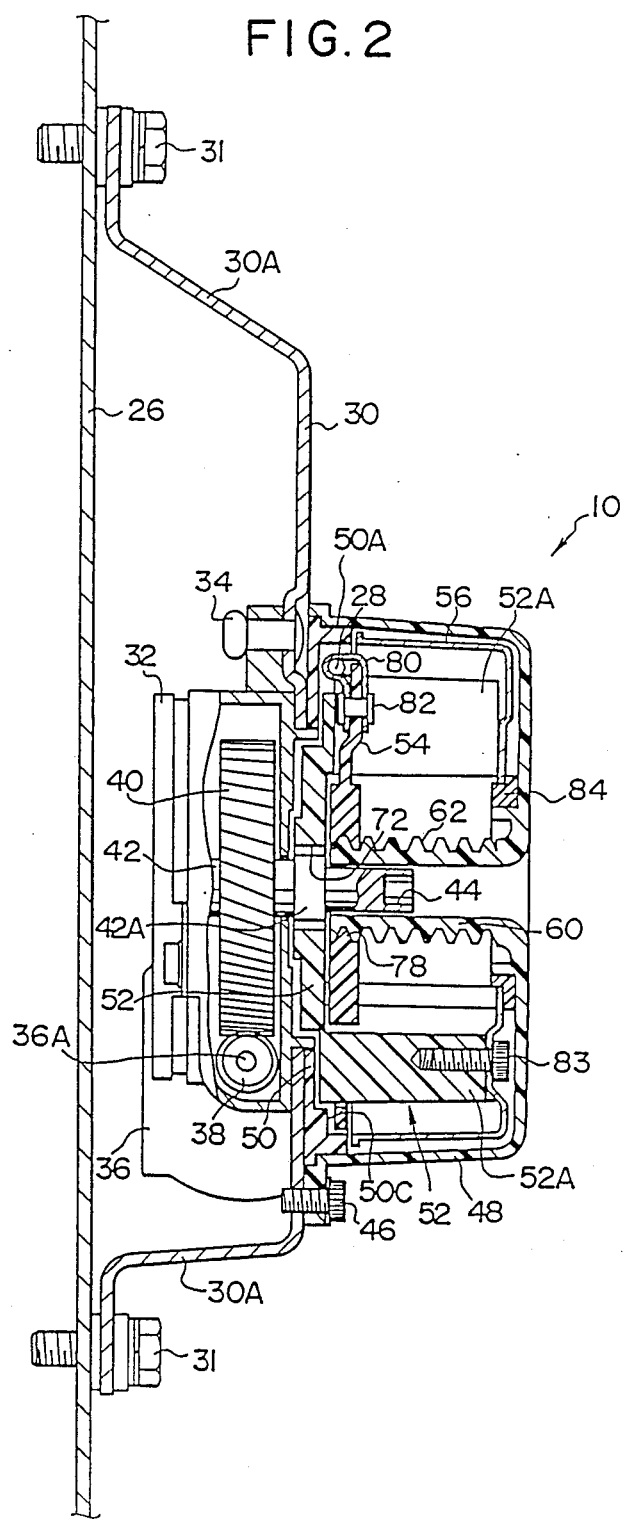
FIG. 2 is a cross-sectional view of the webbing driving device of FIG. 1, showing an assembled state thereof.

The webbing driving device 10 includes a base plate 30 as shown in FIG. 2. The base plate 30 has leg plates 30A formed on the peripheral edge portion thereof at three locations. The forward ends of the bending leg plates 30A are fixed to the center pillar 26 by bolts 31.

A gear box 32 is mounted substantially on the central portion of the side of the base plate 30 which faces the center pillar 26 by rivets 34. A motor 36 is mounted on the gear box 32, as shown in FIG. 1, and a rotary shaft 42 is provided on the gear box 32 in such a manner as to be rotatable.

The motor 36 is connected to a switch (not shown) for detecting the occupant's action of getting in or out of the vehicle so that it is actuated when the occupant 12 gets in or out of the vehicle. A worm gear 38 is coaxially mounted on an output shaft 36A of the motor 36, and the rotary shaft 42 is rotated by the motor through the worm gear 38 and a worm wheel 40 engaged therewith.

The forward end portion of the rotary shaft 42 has a bottomed hole 44 of a hexagonal cross-section into which a hexagonal wrench 45 shown in FIG. 1 is inserted when the motor has to be manually rotated. The forward end portion of the rotary shaft 42 projects toward the central portion of a car room through the base plate 30.

A cover 48 is mounted on the side of the base plate 30 opposite to the gear box 32 by screws 46. A sheet 50, an inner drum 42, a screw plate 54, and an outer drum 56 are accommodated in the cover 48 in that order with the sheet 50 being located closest to the base plate 30.

The cover 48 has a grooved protrusion 59 which is integrally formed therewith. The protrusion 59 has a recessed portion 58 along which the wire runs as shown in FIG. 1. The cover 48 also has a hollow shaft portion 60 formed coaxially therewith. The hollow shaft portion 60 is a tubular portion which passes through the outer drum 56 and the screw plate 54, as shown in FIG. 2. An outer periphery of the hollow shaft portion 60 is externally threaded at a large pitch to form a male screw 62 which is to be threadedly engaged with the screw plate 54. The male screw 62 is integrally formed with the cover 48 from a synthetic resin so as to prevent variations in the screw thread that occur in the circumferential direction. More specifically, if the externally threaded hollow shaft portion 60 and the cover 48 are manufactured as separate units and are then fixed to each other by caulking, the hollow shaft portion 60 and the cover 48 are not fixed to each other at the same circumferential position. In this embodiment, since the hollow shaft portion 60 is integrally formed with the cover 48, the hollow shaft portion 60 can be firmly mounted on the cover 48 at the fixed circumferential position.

The forward end portion of the rotary shaft 42 is accommodated in the hollow portion of the hollow shaft portion 60 in such a manner that the engaged hole 44 is exposed to an outside of the cover 48. The hollow portion of the hollow shaft portion 60 has a size which enables the hexagonal wrench 45 to be inserted thereinto so as to manually rotate the rotary shaft 42 by the hexagonal wrench 45 shown in FIG. 1 from the outside of the cover 48.

The outer periphery of the forward end portion of the rotary shaft 42 is made in contact with or is separated by a small gap from the inner peripheral surface of the hollow shaft portion 60 so that the outer periphery of the rotary shaft 42 is supported by the inner periphery of the hollow shaft portion 60 when the rotary shaft is manually rotated using the hexagonal wrench 45.

An inner drum 52 has a disk-like form. It has protrusions 52A of a substantially fan-like cross-section. The protrusions 52A protrude in the axial direction and are located substantially equiangularly at three positions in the circumferential direction of the inner drum 52. The protrusions 52A are tapered in such a manner that the diameter of a circle enveloping the protrusions 52A becomes slightly smaller toward the forward end of the protrusions 52A. An axial portion of the inner drum 52 is provided with a rectangular hole 72. A driving portion 42A of a rectangular cross-section which is formed at an intermediate portion of the rotary shaft 42 is fitted into this rectangular hole 72, by which the inner drum 52 is rotated by the rotation of the rotary shaft 42.

The screw plate 54 has a disk-like form. It has fan-like holes 74 formed equiangularly at three locations in the circumferential direction. The protrusions 52A of the inner drum 52 are fitted into these holes 74, by which the screw plate 54 can be rotated by the rotation of the inner drum 52. The end of the wire 28 is supported by the peripheral edge portion of the screw plate 54 through a clamp 80 and a rivet 82. The axial portion of the screw plate 54 is internally threaded so as to form a female screw 78 which is threadedly engaged with the hollow shaft portion 60 of the cover 48. In consequence, when the rotary shaft 42 rotates, the screw plate 54 is rotated together with the rotary shaft 42 and at the same time is moved in the axial direction so as to allow the wire 28 to be wound around the outer periphery of the inner drum 52 in helical fashion. Each time the rotary shaft 42 makes a revolution, the wire 28 is wound once around the outer periphery of the inner drum 52, and the screw plate 54 is moved in the axial direction by a distance equivalent to the diameter of the wire 28 so as to allow the wire 28 to be wound around the outer periphery of the inner drum 52 tightly.

The peripheral edge portion of the screw plate 54 slopes downwardly by a fixed angle around the periphery except for the portion thereof which supports the wire, so as to form a sloping surface 54A on the lower surface of the screw plate 54. The sloping surface 54A is formed in such a manner that it is parallel to the direction in which the wire is wound around the outer periphery of the inner drum 52. In other words, the wire 28 is wound around the outer periphery of the inner drum 52 in helical fashion a plurality of times in such a manner that the axis of the wire 28 is inclined with respect to the tangential line of the inner drum 52 by an angle $\theta 0$ in FIG. 1, and the sloping surface 54A is made inclined by the angle equivalent to this angle. The wire 28 is wound around the outer periphery of the inner drum 52 parallel to the sloping surface 54A.

The screw plate 54 and the female screw 78 are formed as one unit from a synthetic resin so as to prevent variations in the screw thread from occurring in the circumferential direction. Since the male screw 62 of the hollow shaft portion 60 is also formed in such a manner that variations in the screw thread thereof do not occur in the circumferential direction, the winding of the wire 28 around the outer periphery of the inner drum 52 can be started from a fixed position in the axial direction of the inner drum 52.

The outer drum 56 is mounted on the inner drum 52 by vises 83 in such a manner as to be rotatable together with the inner drum 52. The screw plate 54 and the inner drum 52 are accommodated in the outer drum 56 with a gap for the wire being formed between the outer periphery of the inner drum 52 and the outer drum 56 so as to limit the movement of the wire 28 in the radial direction of the inner drum. A bushing 84 is provided between the outer drum 56 and the inner wall of the cover 48 so as to prevent direct contact of the outer drum with the cover 48.

The sheet 50 is disposed between the base plate 30 and the inner drum 52 with the peripheral edge portion thereof being gripped between the cover 48 and the base plate 30. The sheet 50 thereby limits the movement of the wire 29 toward the base plate 30.

The peripheral wall 50A of the sheet 50 is provided with a block 50B which projects in the tangential direction of the sheet. The block 50B has a through-hole 68 for the wire. Therefore, the wire 28 passes through the through-hole 68 and is led in the sheet 50. The wire 28 is then moved along a sloping surface 50C formed over ¾ of the periphery of the sheet in the axial direction of the rotary shaft 42 and is wound around the outer periphery of the inner drum 52 in helical fashion. The sloping surface 50C is formed parallel to the direction in which the wire 28 is wound around the outer periphery of the inner drum 52 in helical fashion. In other words, the sloping surface 50C slopes downwardly by an angle equivalent to that formed between the axis of the wire 28 wound around the outer periphery of the inner drum 52 a plurality of times and the tangential line of the inner drum 52 an angle $\theta$ in FIG. 1, and the wire 28 is wound around the outer periphery of the inner drum 52 parallel to the sloping surface 50C.

Thus, the wire 28 is wound around the protruding portions 52A with the same winding diameter while being gripped by the screw plate 54 and the sheet 50. In consequence, when the rotary shaft 42 is rotated in the wire drawing-out direction, that is in the direction indicated by an arrow A in FIG. 1, the wire receives the compressive force in the axial direction, and is drawn from the inner drum 52 through the through-hole 68.

An operation of this embodiment will be described as below.

In a state wherein the occupant 12 is not sitting in the seat 11, the slider 20 is located at the forward end portion of the guide rail 24 with the webbing 14 being in a state shown by the imaginary line in FIG. 3.

This allows the driver or the passenger 12 to sit in the seat 11 easily. Once the occupant seated himself or herself in the seat 11, this is detected by a switch (not shown), and the rotary shaft 42 is rotated by the motor 36 in the direction in which the wire 28 is wound around the inner drum 52 so as to allow the wire 28 to be wound on the inner drum 52 in helical fashion. As a result, the slider 20 is moved toward the rear portion of the vehicle along the guide rail 24 through the wire 28, and the webbing 14 is automatically placed on the driver or the passenger 12, as shown by the solid line in FIG. 3.

When the vehicle speed is reduced, the drawing-out of the webbing 14 is terminated by the winding device 18 so as to enable the occupant 12 to be tightly fastened by the webbing 14.

In a case where the occupant 12 gets out of the vehicle, this getting out action is detected by the switch (not shown), and the rotary shaft 42 is then rotated by the motor 36 in the direction in which the wire 28 is drawn out from the inner drum so as to allow the wire 28 to be drawn from the inner drum 52. be drawn from the inner drum 52.

As a result, the slider 20 is moved toward the forward portion of the vehicle along the guide rail 24 through the wire 28, and the webbing 14 is automatically released from the occupant 12.

In a case where the motor 36 cannot work due to breakage of the power from the vehicle power source, the hexagonal wrench 45 is inserted into the bottomed hole 44 via the hollow portion of the hollow shaft portion 60 of the cover 48 in order to rotate the rotary shaft 42 and thereby move the webbing 14. Every time the rotary shaft 42 makes one turn, the wire 28 is once wound around the outer periphery of the inner drum 52 or drawn from the inner drum 52, allowing the webbing 14 to be moved fast.

In that case, since the forward end portion of the rotary shaft 42 is accommodated in the hollow shaft portion 60, the flexural strength of the hollow shaft portion 60 is increased and the reliability thereof is improved.

Any other jig may also be used in place of the hexagonal wrench 45.

Thus, in the webbing driving device 10 for driving the webbing 14 so as to put it on the occupant 12 or to release the occupant 12 from the webbing 14, since the female screw 78 on the screw plate 54 and the male screw 62 on the hollow shaft portion 60 which engages with the female screw 78 are respectively formed integrally with the screw plate 54 and the cover 48 by the synthetic resin so as to enable winding of the wire 28 on the outer periphery of the inner drum 52 to be started from a fixed height of the inner drum 52, variations in the winding position of the wire 28 wound around the inner drum 52 which occur in the axial direction thereof can be eliminated. In consequence, variations in the gap between the wire 28 and the sheet 50 which occur in the state wherein the wire 28 is wound around the inner drum 52 can be eliminated, and the gap can be kept at a predetermined value, enabling generation of noises caused by the movement of the wire 28 when it is drawn out as well as pinching of the wire 28 against the sheet 50 to be prevented.

Further, the sheet 50 and the screw plate 54 respectively have the sloping surfaces 50C and 54A, and the wire 28 is wound around the inner drum 52 parallel to the sloping surfaces 50C and 54A. In consequence, in a state where the wire 28 is wound around the inner drum 52, the gaps between the sheet 50 and the wire 28 and between the screw plate 54 and the wire 28 are respectively fixed around the periphery of the inner drum, and the gap between the sheet 50 and the wire 28 can be thereby kept constant around the periphery of the inner drum. This enables the gap between the sheet 50 and the wire 28 formed when the wire 28 is wound around the inner drum 52 to be set to a predetermined value, eliminating generation of noises caused by movement of the wire 28 when it is drawn out as well as pinching of the wire 28 against the sheet 50.

Further, the gear box 32, the motor 36, the inner drum 52 and another components are mounted on the base plate 30 which is in turn mounted on the center pillar 26 by the bolts 31. In consequence, if the mounting position of the webbing driving device has be changed in accordance with a model of a vehicle, a base plate having a different number of leg portions 30A or having leg portions of different form, length or bending angle may be used to mount the webbing driving device on a body of the vehicle. This enables a large number of components to be used in common.

What is claimed is:

1. A webbing driving device for use in a seat belt apparatus for fastening a webbing on an occupant, and for releasing said webbing by moving a wire connected to said webbing, comprising:
   a rotatable drum;
   a screw plate connected to said wire, and being movable in an axial direction of said rotatable drum when rotated together with said rotatable drum;
   a wire driving means for winding said wire around said drum in helical fashion by rotating said rotatable drum and said screw plate in a first direction while moving said screw plate in one direction of said axial direction and for drawing said wire from said rotatable drum by rotating said drum and said screw plate in a second direction opposite to said first direction while moving said screw plate in the other direction of said axial direction;
   a first sloping surface formed on said screw plate substantially parallel to the direction in which said wire is wound around said rotatable drum so as to define one end of the wire winding area in said axial direction of said rotatable drum; and
   a second sloping surface formed substantially parallel to the direction in which said wire is wound around said rotatable drum so as to define the other end of said wire winding area in said axial direction of said rotatable drum.

2. A webbing driving device for use in a seat belt apparatus according to claim 1, wherein said screw plate is rotatably supported by a screw means, so that it can be moved in said axial direction of said rotatable drum during rotation.

3. A webbing driving device for use in a seat belt apparatus according to claim 2, wherein said screw means is integrally formed with a cover for accommodating said rotatable drum on the outer periphery of a protruding portion which protrudes coaxially with respect to said rotatable drum.

4. A webbing driving device for use in a seat belt apparatus according to claim 3, wherein said protruding portion comprises a tubular portion having a through-hole which is formed coaxially with respect to said rotatable drum so as to communicate the interior and the outside of said cover.

5. A webbing driving device for use in a seat belt apparatus according to claim 3, wherein said screw plate has a screwed portion which is formed integrally therewith, and said screw portion is threadedly engaged with said screw means.

6. A webbing driving device for use in a seat belt apparatus according to claim 4, wherein said wire driving means has a rotary shaft for rotating said rotatable drum, and said rotary shaft has an exposed portion which is exposed to the outside through said through-hole of said tubular portion.

7. A webbing driving device for use in a seat belt apparatus according to claim 6, wherein said exposed portion of said rotary shaft has an engaged portion engaged with a rotation operating jig so as to allow said rotary shaft to rotate.

8. A webbing driving device for use in a seat belt apparatus according to claim 7, wherein said engaged portion comprises an angular hole formed at the end surface of said rotary shaft, and said jig comprises a wrench engaged with said angular hole.

9. A webbing driving device for use in a seat belt apparatus according to claim 1, further comprising a base plate through which said rotatable drum and said wire driving means being mounted on a car body.

10. A webbing driving device for use in a seat belt apparatus according to claim 1, wherein said rotatable drum includes an inner drum having an outer peripheral portion for winding said wire, and an outer drum having an inner periphery which faces said outer peripheral portion of said inner drum, said outer drum and said inner drum defines a space for accommodating said wire in the radial direction of said drum.

11. A webbing driving device for use in a seat belt apparatus according to claim 10, wherein said outer drum is supported by said inner drum in such a manner as to be rotatable together with said inner drum.

12. A webbing driving device for use in a seat belt apparatus according to claim 3, wherein said second sloping surface is formed on a sheet member for defining a space for accommodating said rotatable drum between said cover.

13. A webbing driving device for use in a seat belt apparatus according to claim 12, wherein said sheet member has a guide portion which guides said wire when it is wound around and drawn from said rotatable drum.

14. A webbing driving device for use in a seat belt apparatus for automatically fastening a webbing on an occupant, and releasing said webbing by moving a wire connected to said webbing, comprising:
   a rotatable drum;
   a cover for covering said rotatable drum;
   a screw plate connected to said wire, and being supported by a screw means formed on an outer periphery of a protruding portion provided on said cover coaxially with respect to said rotatable drum, in such a manner as to be movable in the axial direction of said rotatable drum by being rotated in the same direction by the rotation of said rotatable drum;
   a wire driving means for winding said wire around said drum in helical fashion by rotating said rotatable drum in a first direction and thereby rotating said screw plate while moving the same in one direction of said axial direction of said rotatable drum and for drawing said wire from said rotatable drum by rotating said rotatable drum in a second direction opposite to said first direction and thereby rotating said screw plate while moving the same in the other direction of said axial direction of said rotatable drum;
   a first sloping surface formed on said screw plate substantially parallel to the direction in which said wire is wound around said rotatable drum so as to limit the movement of said wire in the axial direction of said rotatable drum at one end;
   a sheet member for defining a space for accommodating said rotatable drum together with said cover; and
   a second sloping surface formed in said sheet member substantially parallel to the direction in which said wire is wound around said drum so as to limit the movement of said wire in the axial direction of said drum at the other end.

15. A webbing driving device for use in a seat belt apparatus according to claim 14, wherein said screw means is integrally formed with said cover, and said screw plate has a screwed portion which is formed integrally therewith, and said screwed portion is threadedly engaged with said screw means.

16. A webbing driving device for use in a seat belt apparatus according to claim 15, wherein said protruding portion comprises a tubular portion having a through-hole which is formed coaxially with respect to a rotary shaft of said drum so as to communicate the interior and the outside of said cover.

17. A webbing driving device for use in a seat belt apparatus according to claim 16, wherein said wire driving means has a rotary shaft which is engaged with said rotatable drum so as to rotate it, the forward end portion of said rotary shaft being located in said through-hole in such a manner as to be exposed to the outside.

18. A webbing driving device for use in a seat belt apparatus according to claim 14, further including a base plate through which said rotatable drum and said wire driving means are mounted on a car body.

19. A webbing driving device for use in a seat belt apparatus according to claim 14, wherein said rotatable drum includes an inner drum having an outer peripheral portion around which said wire is wound, and an outer drum having an inner periphery which faces said outer peripheral portion of said inner drum, and said outer drum and said inner drum define a space for accommodating said wire in the radial direction of said drum.

20. A webbing driving device for use in a seat belt apparatus according to claim 14, wherein said sheet member has a guide portion which guides said wire when it is wound around and drawn from said drum.

* * * * *